United States Patent [19]

Bernstein et al.

[11] 4,088,628

[45] May 9, 1978

[54] ATACTIC POLYPROPYLENE TAPE

[75] Inventors: Philip Bernstein, Yardley; James P. Coffey, Hatboro, both of Pa.

[73] Assignee: ESB Incorporated, Philadelphia, Pa.

[21] Appl. No.: 713,683

[22] Filed: Aug. 12, 1976

[51] Int. Cl.² .............. H01M 2/08; H01M 10/54; C08K 3/04; C08K 5/01

[52] U.S. Cl. .............. 260/42.46; 429/49; 156/94; 428/516

[58] Field of Search .............. 429/49; 156/94; 428/516, 523; 260/42.46

[56] References Cited

U.S. PATENT DOCUMENTS

| 3,577,373 | 5/1971 | Flanagan et al. | 260/42.46 |
|---|---|---|---|
| 3,629,186 | 12/1971 | Hull et al. | 260/42.46 |
| 3,671,383 | 11/1968 | Sakata et al. | 428/516 |
| 3,817,904 | 6/1974 | Gagle et al. | 260/42.46 |
| 3,865,662 | 2/1975 | Segal | 156/94 |
| 3,928,281 | 12/1975 | Uchigaki et al. | 260/42.46 |
| 4,046,945 | 9/1977 | Baxmann et al. | 260/42.46 |

OTHER PUBLICATIONS

J.W.M., Battery Failure, Popular Science, p. 149(3), Sep. 1944.

Primary Examiner—Donald L. Walton
Attorney, Agent, or Firm—Gilbert W. Rudman

[57] ABSTRACT

A tape comprised of an atactic polypropylene and a non-conductive filler is described. This tape is useful in a process which enables a secondary battery having a defective seal to be repaired safely while remaining in operation.

5 Claims, No Drawings

ATACTIC POLYPROPYLENE TAPE

BACKGROUND OF THE INVENTION

1. Field of the Invention

This invention relates to a tape useful as a sealant and for insulation. More particularly, it relates to a tape useful for repairing defective seals in secondary batteries.

2. Description of the Prior Art

Casings for secondary batteries consist of containers and covers. Usually the containers and covers are molded of a thermoplastic material such as polystyrene, polymethacrylate, polyamide, polyolefin, polyvinyl chloride, polyformaldehyde and the like. After the battery is assembled, the space between the container and cover is sealed with a sealant compound.

Most sealant compounds are not entirely satisfactory because they are not able to provide a crackfree seal during the total useful life of the battery. This is particularly true for secondary batteries exposed to vibration, very low or very high temperatures and used for applications requiring a rugged long life device. Over the course of years the sealant compound may, for a variety of reasons, become brittle and often breaks, forming cracks and holes which allow solvent to evaporate and electrolyte to escape. For such batteries to remain useful the holes and cracks, i.e., the defective seal, must be repaired.

The known compounds used for repairing defective seals are utilized in processes that require the battery to be disconnected, removed from operation, and possibly moved to a different site for the repair to be done safely. The tape of this invention can be used in a process done with complete safety while the battery is in operation and on-site.

SUMMARY OF THE INVENTION

The invention is a tape comprised of atactic polypropylene and non-conductive filler.

DETAILED DESCRIPTION OF THE INVENTION

The tape of the current invention is prepared by mixing an atactic polypropylene with a non-conductive filler and then forming the mixture into a tape.

The composition of the tape is 60% – 95% by weight based on the weight of the total composition atactic polypropylene and 5% – 40% by weight based on the weight of the total composition non-conductive filler. Preferably, the percentage by weight atactic polypropylene will be 65% – 90%, more preferably, 75% – 85%, and the balance non-conductive filler.

Atactic polypropylene useful in the invention is, at room temperature, a noncrystalline, waxy, slightly tacky solid. It becomes softer and more tacky with increasing temperature and gradually becomes molten. Atactic polypropylene does not have a sharp melting point, but over a temperature range of 120° – 175° C, it becomes a viscous liquid that can be pumped by conventional means. The typical molecular weight range of atactic polypropylene is 3,000 – 10,000.

A preferred atactic polypropylene will have a softening point determined by ASTM - E28-51 of about 100° to 110° C, more preferably, 105° – 107° C; a viscosity determined by Brookfield Thermosel system of 5000 – 9000 centipoise at 149° C, more preferably 5500 – 8500 centipoises, and a density determined by ASTM-D792 at 23° C of 0.82 – 0.90 grams per cubic centimeter, more preferably, 0.85 – 0.87 grams per cubic centimeter.

Examples of such atactic polypropylenes are Eastobond N5K, N5W, N500S, and N510S, all of which are sold by Eastman Chemical Products, Inc.

Non-conductive filler useful in the invention can be a filler such as, for example, asbestos, talc, titanium dioxide, and carbon black. The non-conductive filler must be a material that is non-leachable under operative temperatures and hence not interfere with the operation of the object sealed or insulated. Addition of the filler improves the flow characteristics and extrudability of the tape.

Preferably the filler will be a carbon black having a medium particle size, i.e., able to pass through a 70 mesh sieve. A preferred carbon black is thermal black. More preferably, the thermal black will have a specific gravity of 1.80, and a moisture content of .5% maximum. Such a medium thermal black is Floform Thermax ASTM-N-990 sold by H. M. Royal, Inc. Filler having large particles is ground to reduce the particle size to the required size.

The tape of this invention is prepared by mixing the atactic polypropylene and the non-conductive filler together and then by forming, preferably by extrusion, a tape having the dimensions desired for its use.

The tape, once formed, will be low temperature melting, tacky, inert, and unaffected by secondary battery electrolyte. It will adhere to thermoplastic materials such as those which are utilized to construct containers and covers of battery casings, especially, thermoplastic materials such as polystyrene, polyethylene, and crystalline polypropylene.

The tape of this invention may be used for sealing and/or insulating any object so long as it will, in operation, not be exposed to temperatures over 75° C. The tape can be stamped or shaped into ropes, washers, plugs, sheets, channels, half rounds, pre-form or whatever shape is required for a specific purpose.

The tape is useful in a process for repairing defective seals of storage batteries while maintaining the battery in operation. A storage battery or a secondary battery is comprised of a container, a cover, a cell element located in the container, the element having an anode, a cathode, separator and electrolyte, and a sealant area comprised of a sealant space, a sealant located in the sealant space, and areas of the container or cover located near the sealant space. The seal area is defective because the sealant contains cracks and voids. The process comprises preparing the battery, this can be by neutralizing the sealant area and then by rinsing and drying the sealant area. The tape is cut into strips, preferably four, two having the same length as the battery, and two having a length equal to the width of the battery. The tape is then carefully placed upon the total length of the defective sealant area.

The tape will then be heated to a temperature of 95° C to 125° C with the understanding that the lower the temperature the longer the time required for the heat to be applied. Preferably, the tape will be heated to 105° – 110° C for a period of approximately 1 to 20 minutes, more prefereably, 5 to 15 minutes. The temperature used should not be higher than 125° C because some types of thermoplastic containers cannot withstand such high temperatures and the tape at such temperature may lose its physical integrity.

Preferably the process will utilize as a heating means a heater having the heating element completely enclosed, with no exposed metallic parts, within molded fiberglass reinforced silicone rubber which is flexible and L-shaped to enable easy insertion underneath intercell connectors during operation of the cell. The heaters are molded to the dimensions required to cover the seal area of each type battery. Two L-shaped heaters are required for each battery. The preferred heaters are placed over the seal area, and then are used to raise the temperature of the tape from ambient to 110° over a period of approximately 2–10 minutes, the temperature is maintained at 110° C for approximately 5–15 minutes, and then the heater is turned off but is not removed from the sealant area until the tape has cooled.

EXAMPLE 1

A tape was prepared as follows:

A. The following materials and equipment were assembled:

1. Eastobond M-500-S (a low molecular weight atactic polypropylene sold by Eastman Chemical Products, Inc.)
2. Thermax N-990 (a medium particle size thermal black sold by H. M. Royal, Inc.)
3. 801S Release Paper (a one sided release paper sold by M & C Specialties.)
4. An extruder comprised of three-fourths inch Dia. Brabender Plastograph, adjustable ribbon die, metering screw, conveyor and winding take-off.

B. The manufacturing procedure was as follows:

1. The Thermax N-990 was ground overnight and was sieved through a 70 mesh screen.
2. Eastobond M-500-S slats were cut into one-fourth inch or smaller cubes.
3. 80 parts by weight cubes of Eastobond M-500-S and 20 parts of weight sieved Thermax N-990 were placed into a polyethylene bag.
4. The 80/20% mixture was mixed and blended by closing the bag and hand kneading for approximately 5 minutes to disperse Thermax N-900 over the surface of the Eastobond M-500-S.
5. The extruder was preheated as follows: Zone 1°–150° C, Zone 2°–75° C and Zones 3–4 off. The extruder die was water cooled.
6. Take-off release paper was placed opposite the extruder die to take up the mixture as it was extruder.
7. Mixture from the polyethylene bag was poured into the throat of the extruder and the extruder was started at 30 rpm.
8. The mixture was hand forced into the screw area using a push rod.
9. The screw speed was gradually increased from 30 to 50 rpm during a 5 minute period.
10. The extrudate was taken up on the release paper as it emerged from the die, air cooled on the moving conveyor, and wound up into a roll of tape. The take-off line speed was adjusted to coincide with extrudate speed in order to minimize excessive drawdown effects.
11. Extruded tape was collected in rolls 10.67 meters long × 1.59 cm wide by 0.152 cm thick.

EXAMPLE 2

A Tape was prepared as follows:

1. Introduce 400 parts by weight Eastobond N-500-S chips (described in example 1). To unheated rolls of the Troester WC3 mill (sold by Thorester Manufacturing Company).
2. After both rolls of the mill are coated, slowly add 100 parts by weight of Thermax N990 Carbon Pellets (described in example 1).
3. After approximately 5 minutes, strip the material from the rolls. Cut the material in strips 2.54 centimeters in diameter and into lengths corresponding to the width of the striping tool.
4. Force feed these strips into the throat of an MTM extruder. Maintain a temperature of 100° F in the number 2 cylinder. No other heating or cooling is required. The speed of the screw is adjusted for uniform output from the extruding die.
5. Remove the material from the extruder by means of a conveyor belt to which a 4 inch wide strip of double facing non-stick paper is packed.
6. While on the release paper, the desired lengths of tape are cut and stacked for shipping.

EXAMPLE 3

Secondary batteries having defective seals were repaired with safety while in operation and on-site by the following procedure and by using the tape prepared in Example 1. (The tape of Example 2 can also be used.)

The batteries repaired were ESB - WECO - Type KCS-15544, sold by ESB Incorporated, assembled in polystyrene containers.

The procedure followed was:

A. Preparing the defective sealant area.

1. Neutralize the sealant area by wiping area with cloth dipped in neutralizing Sodium Bicarbonate solution.
2. Rinse the above neutralized area using a separate cloth dipped in water.
3. Dry the neutralized, wet sealant area by wiping or blotting with a dry clean absorbent cloth.

B. Placing the tape over the defective sealant area.

1. The elapsed time between the drying of the seal area and this stage of the procedure should be no more than ½ hour.
2. Cut strips of the repairant tape to the length & width dimensions of the cover. Keep the release paper on the tape while cutting.
3. Remove the release paper from each piece of tape before applying.
4. Carefully position the tape over the defective sealant area so that one edge of the tape is in contact and flush with the top outside edge of the container wall and the opposite edge of the tape is in contact with the battery cover.
5. Each piece of tape should overlap the other at each corner of the cell and should be laid in contact along its entire length with the sealant area.

C. Heating the tape

1. The heating means used were heaters having the heating element completely enclosed, with no exposed metallic parts, within molded fiberglass reinforced silicone rubber which is flexible and L-shaped to enable easy insertion underneath intercell connectors during operation of battery. The heaters are molded to the dimensions required for each type battery. Two heaters are required for each battery.
2. Carefully place the heater upon the battery so that the heater encases the sealant area for its entire length.
3. The heaters are used to heat the tape from ambient to 110° C in about 6 minutes. The temperature is maintained at 110° C for 9 minutes. The heater is turned off but not removed.

4. The tape is then cooled for 30 minutes with the heaters in place.
5. Carefully remove the heaters. The tape has flowed into all cracks and holes thereby producing a repaired seal which is continuous and free of all deficiencies.

EXAMPLE 4

The tape was used as follows:

(a) Insulating Battery Posts

Automotive battery posts with connecting copper wires in place were covered with tape and pressure formed to shape of post and connection by hand pressure. The post-wire connection was immersed in 1.280 Sp. Gr. sulfuric acid for 30 days. At the end of the test period, the area was washed and hand peeled to expose the post and connection — no indications of corrosion or penetration of the acid on the post or connection. In this case, an acid seal was achieved by hand pressure only.

(b) Electrical Contact Insulation Repair

In an area of electrical contact where several wires were exposed for testing and in close proximity, we used the tape to function as an insulation protection for electrical shorts by applying the tape with hand forming over the exposed area. This unit still in operation with no shorting, no heat applied.

(c) Thru-the-Wall Plumbing Seal

To make a sealed connection of the overflow pipe to a bath tub, the tape was applied to both sides of the joint and pressure sealed by bolting the pipe flange together. This seal has been in operating for over one year with no water leaks, no heat applied.

(d) Glass-to-Metal Seal

Repaired a leaking fish tank with tape, used the tape as an interface between the glass and metal channel, slight hand pressure applied, watertight seal achieved over one year.

(e) Gutter-Downspout Seal

The poor connection seals usual with downspouts and gutters may be improved with this sealing tape by hand pressure sealing the joints. The flexibility of the tape would be required in this type of seal.

We claim:

1. A tape consisting essentially of
   (a) 95 – 60% by weight atactic polypropylene, and
   (b) 5 – 40% by weight non-conductive carbon black having particles of a size capable of passing through a 70 mesh sieve.
2. The tape of claim 1, wherein the atactic polypropylene has a softening point determined of ASTM-E28-51 of 100° to 110° C, a viscosity determined by Brookfield Thermosel system of 5000 to 9000 centipoises at 149° C, and a density determined by ASTM-D792 at 23° C of 0.82–0.90 grams per cubic centimeter; and wherein the carbon black is a thermal black having a specific gravity of about 1.80 and a moisture content of about 0.5% maximum.
3. The tape of claim 2 wherein the polypropylene concentration is 75 to 85% by weight and the carbon black concentration is 25 to 15% by weight.
4. The tape of claim 1 formed by extrusion.
5. The tape of claim 2 formed by extrusion.

* * * * *